United States Patent [19]

Dougados et al.

[11] 4,193,540
[45] Mar. 18, 1980

[54] APPARATUS FOR AND METHOD OF AUTOMATICALLY IDENTIFYING BARRELS

[75] Inventors: Roland Dougados, Strasbourg; François Pierrot, Souffelweyersheim; Remy Wagner, Strasbourg Meinau, all of France

[73] Assignee: Brasseries Kronenbourg, France

[21] Appl. No.: 889,495

[22] Filed: Mar. 23, 1978

[30] Foreign Application Priority Data

Jun. 21, 1977 [FR] France ............................. 77 19550

[51] Int. Cl.² ..................... G06K 7/10; G01D 21/04; G06K 9/00
[52] U.S. Cl. .............................. 235/454; 250/223 R; 235/467; 340/146.3 K
[58] Field of Search ............... 235/466, 467, 487, 462, 235/468; 250/223 R, 566, 223 B; 340/146.3 F, 146.3 D; 360/1, 2

[56] References Cited

U.S. PATENT DOCUMENTS

| | | | |
|---|---|---|---|
| 3,324,302 | 6/1967 | Orr | 250/223 R |
| 3,617,704 | 11/1971 | Kapsambelis | 340/146.3 K |
| 3,663,800 | 5/1972 | Myer | 340/146.3 K |
| 3,700,860 | 10/1972 | Reynolds | 340/146.3 K |
| 3,728,677 | 4/1973 | Munson | 340/146.3 D |
| 3,889,102 | 6/1975 | Dahlquist | 235/467 |
| 3,916,158 | 10/1975 | Sansone | 235/467 |
| 3,920,124 | 11/1975 | Patterson | 235/462 |
| 3,991,883 | 11/1976 | Hobler | 250/223 B |
| 4,006,343 | 2/1977 | Izura | 235/467 |

*Primary Examiner*—Robert M. Kilgore
*Attorney, Agent, or Firm*—Prutzman, Kalb, Chilton & Alix

[57] ABSTRACT

An apparatus and method is provided for identifying beer barrels and the like by means of omnidirectional reading of coded labels affixed to the top end face of each barrel. The apparatus and method provides for machine readability of the coded labels and the subsequent systematic handling of the barrels through the use of a particular code label arrangement using multiple labels and multiple code scanners. In accordance with this method, four labels having identical codes are placed in such an array that pairs of labels are oriented at an angle of about 45° relative to each other. A pair of spaced optical code readers scan the code bearing end faces of the barrels as they are conveyed through an identification region. The scanning beams are spaced by a distance greater than the diameter of the barrels and are arranged to converge at a location remote from the conveyor at an angle of about 45°. This permits both omnidirectional reading and confirmatory secondary reading of the codes to assure error free handling of the individual barrels. The coded labels are of the bar code type and take the form of rectangular self-adhesive polyester supports resistant to conditions encountered in cleaning the barrels.

6 Claims, 8 Drawing Figures

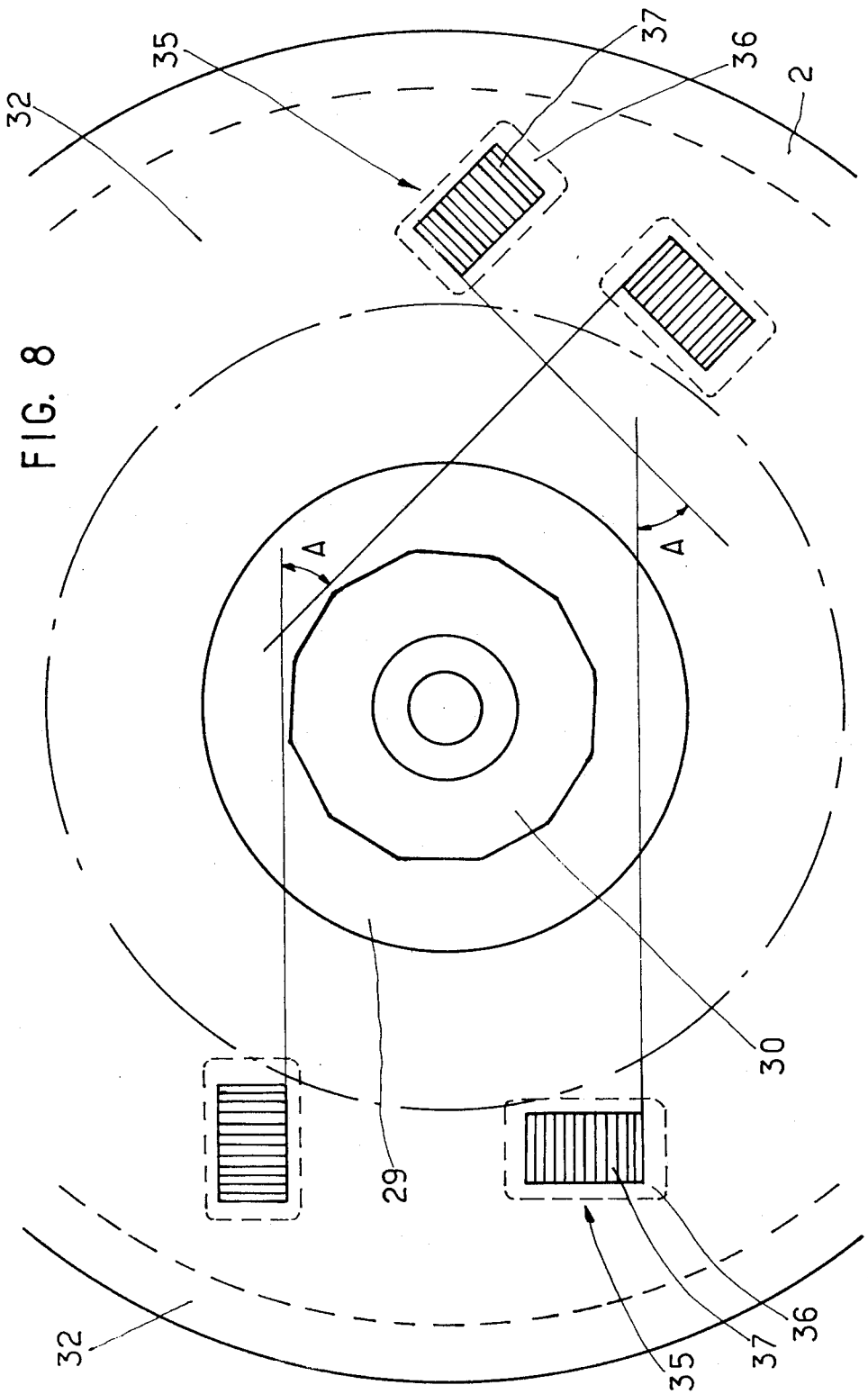

APPARATUS FOR AND METHOD OF AUTOMATICALLY IDENTIFYING BARRELS

This invention relates to an apparatus for and a method of automatically identifying barrels, in particular beer barrels, for the purpose of completely automating the management of a barrel store.

The management of a store of beer barrels, which can reach numbers of the order of 400,000 barrels or more in large breweries, is at present carried out in an unsatisfactory manner. In this respect, even if the purely administrative function is entirely computer controlled, the more important remaining stages, namely the ascertaining of the identification data, are still carried out entirely manually.

This method involves all the drawbacks of a semiautomatic system, combining the high cost of using information processing with the indispensable labour and maintenance costs. Moreover, to ensure continuous operation it is necessary to provide day and night shifts, and to correct human errors etc.

The present invention in one aspect provides apparatus for automatically identifying barrels, comprising a main conveyor for conveying the barrels in a vertical orientation thereof, and a secondary diversion conveyor extending from the initial branch of the main conveyor and separated therefrom by a barrier, an assembly comprising a passage detector controlling an entry door, a detection region with two detectors for scanning and thus analysing the upper faces of the barrels, which latter carry a number of identification labels in a particular arrangement, the said detectors being disposed above the barrels in a position such that they converge at an angle close or equal to 45°, to scan in a vertical plane, and are connected to an interface and an information processing unit, the apparatus also comprising logic control for the entry door and the barrier connected to the processing unit.

Thus there is provided an automatic barrel identification apparatus of entirely automatic operation, which in a preferred construction has a main conveyor with a two-branch track which conveys the barrels in a vertical orientation, a secondary conveyor or additional branch as a prolongation of the initial passage of a main conveyor to create a derivation region for barrels which are not read because of some defect, a waiting region comprising a detector and logic circuit controlling the entry of the barrels one by one and the opening of the entry door giving access to the second conveyor, and an identification region comprising a detector assembly with two readers, for example optical readers, connected via decoders and an interface to an information processing assembly.

The invention in another aspect provides a method of identifying barrels, wherein at least four non-deteriorating identification labels carrying an identification code are attached to the upper surfaces of the barrels, the said labels being placed in particular in a detection region and mutually displaced by a constant angle equal or close to 45°, comprising causing the barrels to file, in a vertical orientation, without previous orientation and by means of a conveyor, past an assembly of two optical detectors the fields of which converge at an angle close or equal to 45°, and analysing the code and processing the information in order to obtain completely automated handling.

The barrels may be thus identified, by glueing or otherwise fixing our labels, mutually offset by an angle of 45°, on a determined region of the upper face of each barrel, followed by continuously reading these labels by an optical method as they file past, and then interpreting their code in order to identify the barrels, so as to completely automate the running of the barrel store.

The present invention has the advantage over the previously known method of completely automating the handling of the store or stock of a brewery or other manufacturing centres which distribute their liquid product in returnable or non-returnable barrels.

The invention will be further described, by way of example only, with reference to the accompanying drawings, in which:

FIG. 4 is a diagrammatic perspective view of the readers which analyse the upper faces of the barrels, the broken line showing another possible position;

FIG. 8 is a plan view of the upper faces of the barrels which carry the identification labels in a different arrangement;

Figure 1:
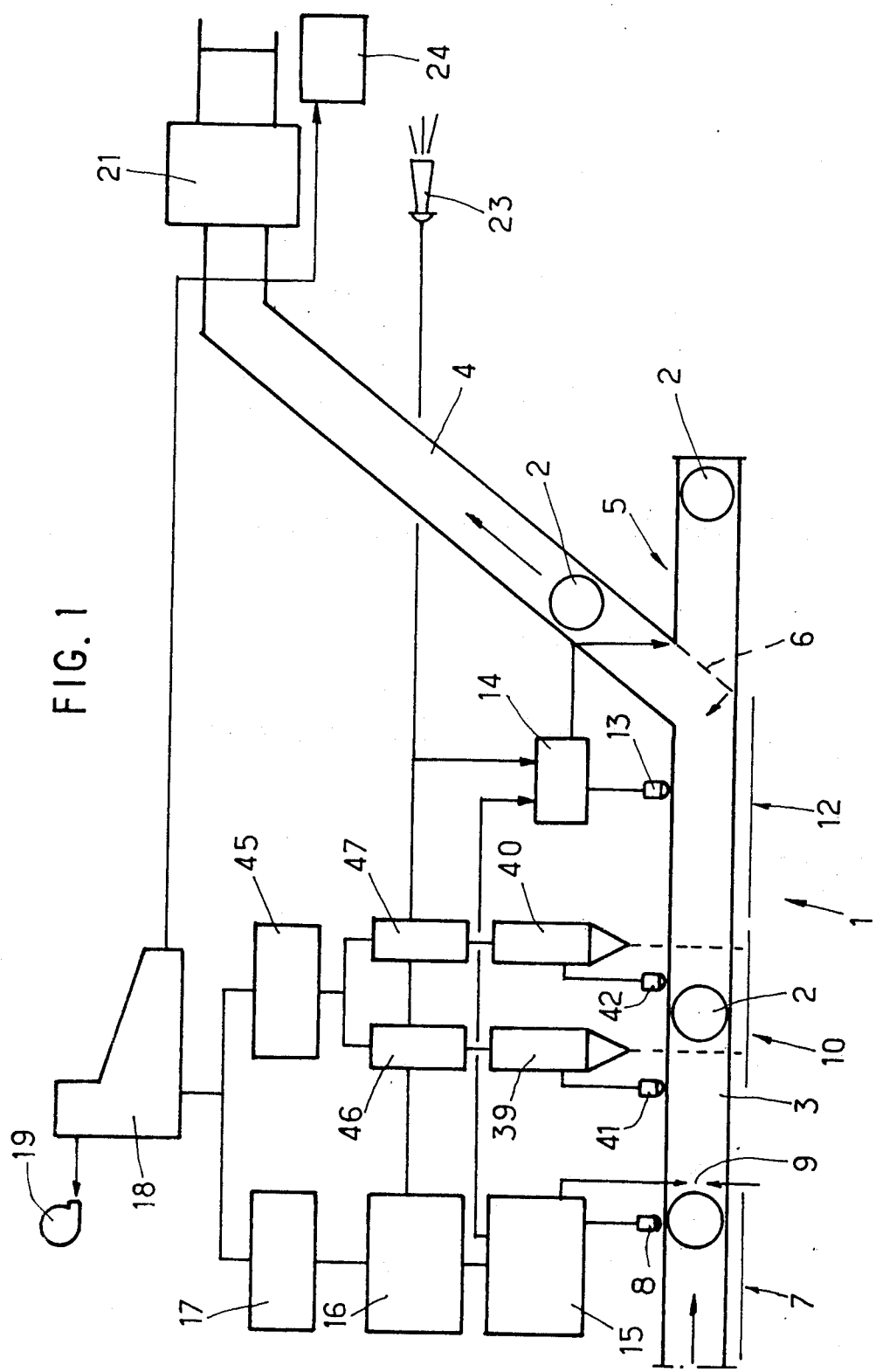
FIG. 1 is an overall diagrammatic representation of an apparatus according to the present invention.

The apparatus shown in the drawings comprises a main conveyor 1, for example a chain conveyor, on which barrels 2 are disposed on end with their bung upwards in their normal position of use. The conveyor 1, has a longitudinal branch 3 along which identification is carried out, and a discharge branch 4 which conveys the barrels towards palletisation operations. To the main conveyor 1 there is added a secondary conveyor 5 or an additional branch extending in the direction of the main conveyor, which serves as a diversion track and is separated from the normal conveying chain by a diversion barrier 6.

The apparatus also includes various control, operating and safety members of normal design and construction, and necessary auxiliary and peripheral devices of known structure.

On the main branch, there is provided a waiting region 7 including a passage detector 8 and terminating in an entry door 9, and an identification region 10 comprising an assembly 11 composed of one or more detectors, for example optical detectors. The conveyor extends through a reliability space 12 which terminates in a detector 13 connected to a control unit 14 for the opening or closure of the barrier 6 as required, to give unidentified barrels access to the diversion region via the branch 5. The detector 13 feeds a signal indicating the termination of the identification stage, for the introduction of the next barrel.

The upstream passage detector 8 controls the opening of the door 9 and various reliability circuits, via a block of logic circuits 15 connected to a decoder 16 for other control functions, namely alarm, manual operation etc., and an interface 17 for its processing by an information processing unit 18, particularly at this point for registering the number of barrels rejected into the diversion region in order to control an alarm. This registration is made in situ, for example on a magnetic support 19, and then utilised by a computer.

Figure 2:
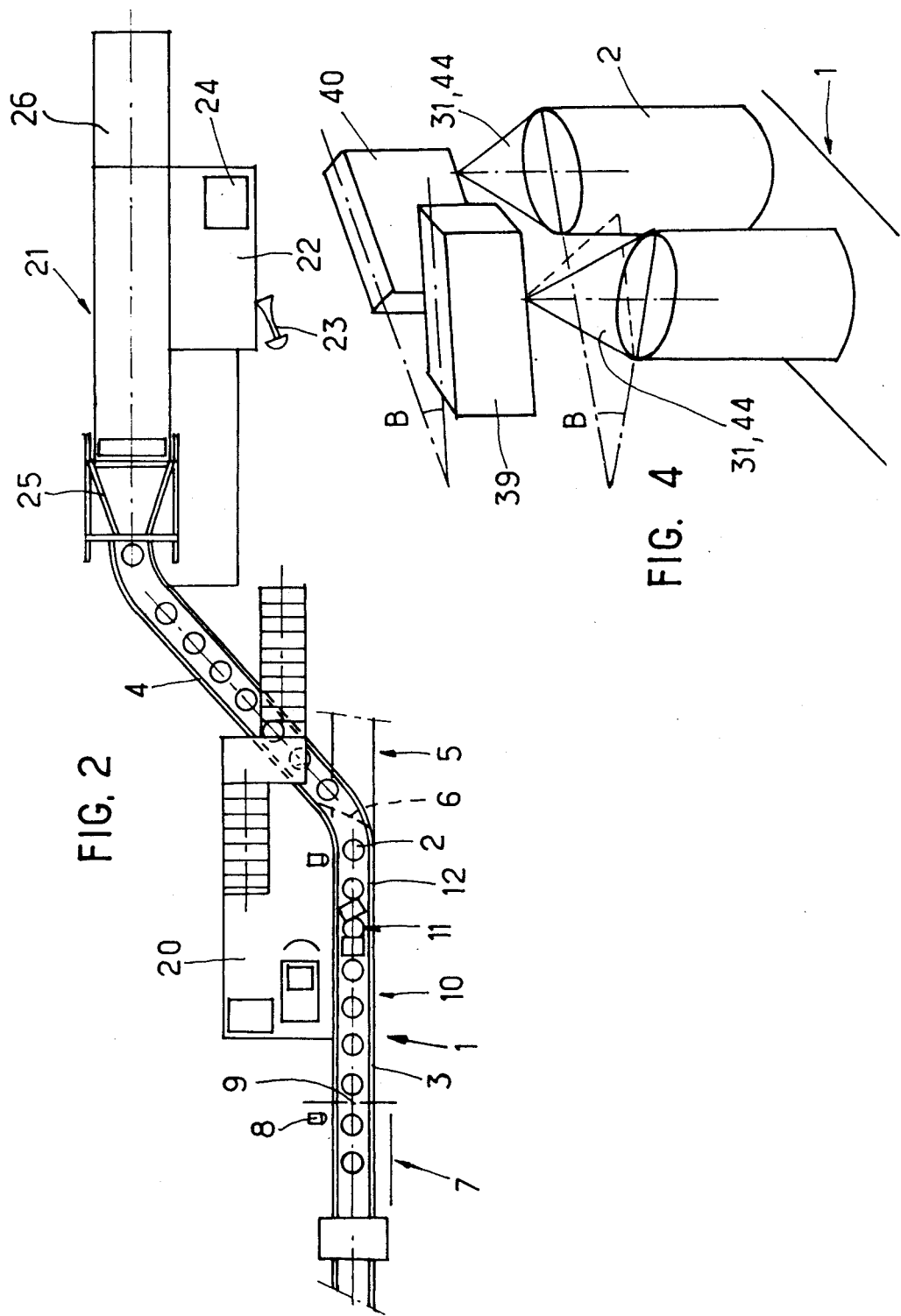
FIG. 2 is a plan view of the apparatus shown in FIG. 1.
Figure 3:
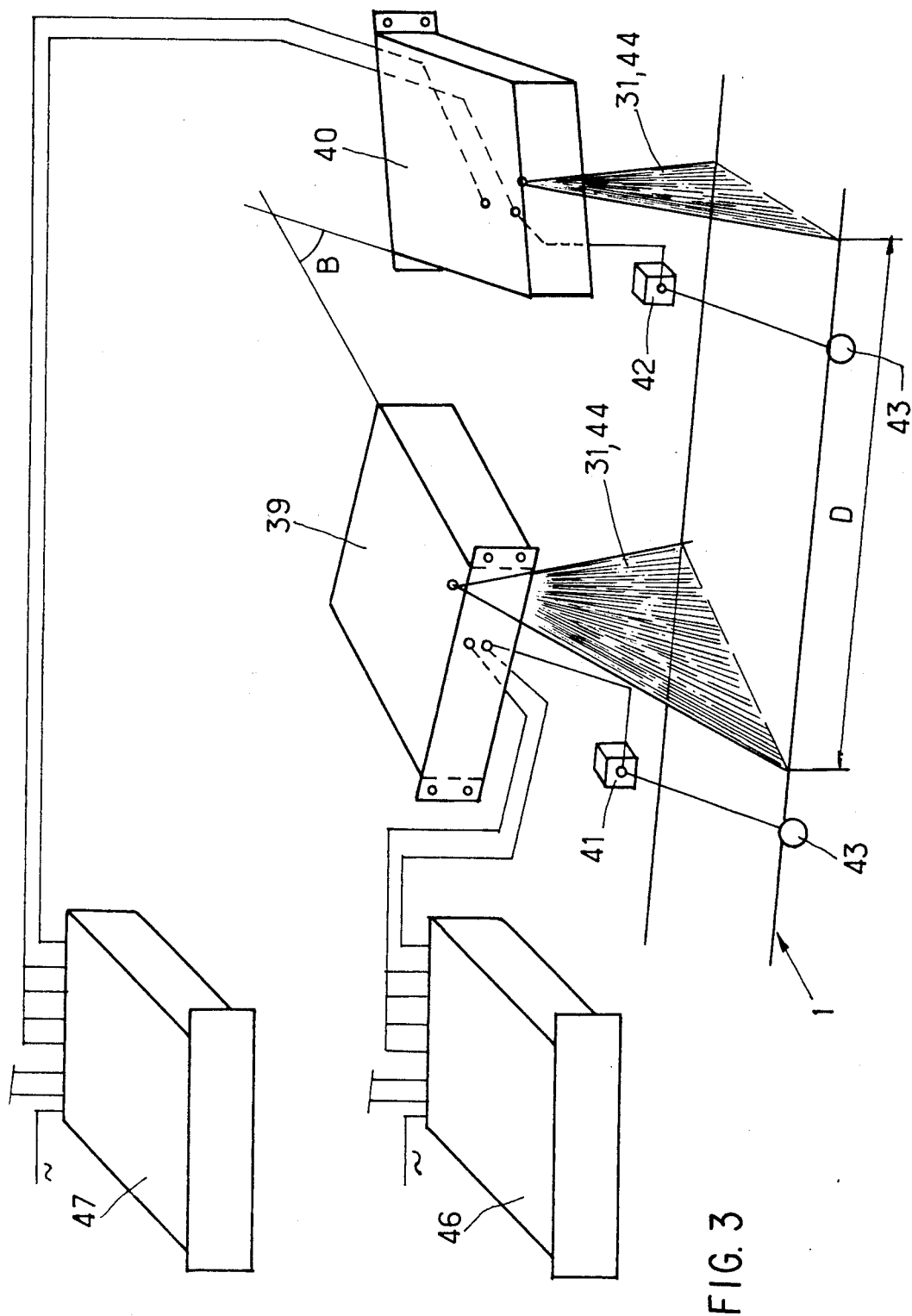
FIG. 3 is a diagrammatic perspective view showing the reading assembly with decoder, reader and associated cells.
Figure 5:
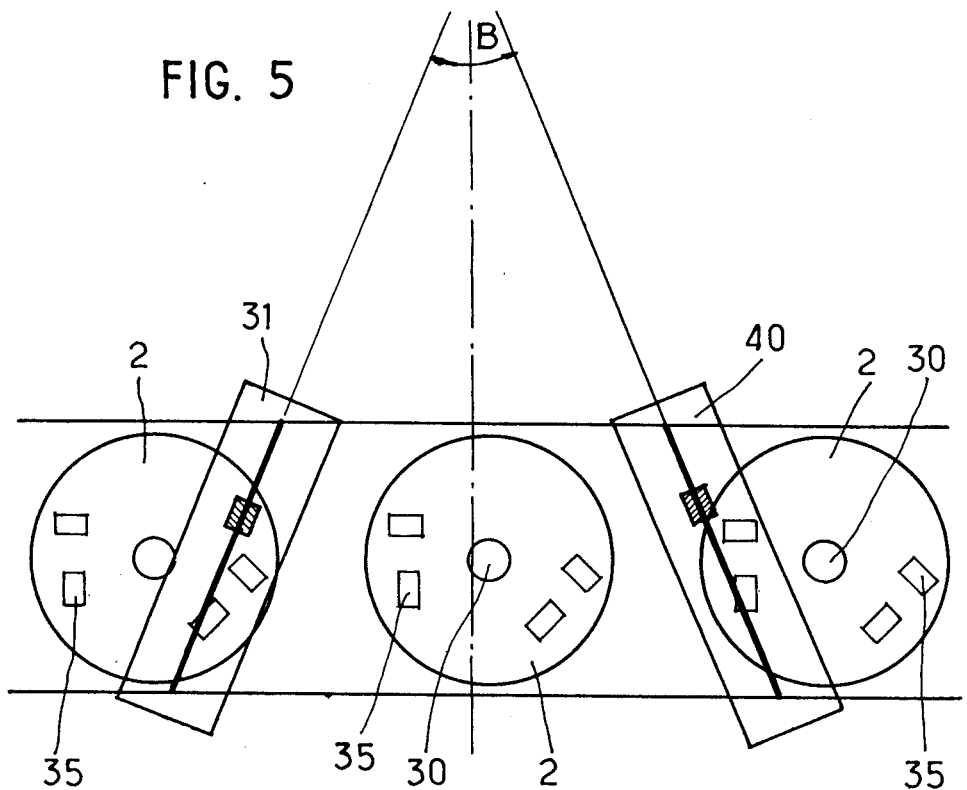
FIG. 5 is a diagrammatic plan view of the readers.

The apparatus further comprises two stations in a reading region, namely a technical monitoring and intervention station 20 comprising the decoders and the other electrical members such as logic and other circuits, and a manual monitoring station. The apparatus also comprises an intervention station 22 at the end of the main conveyor in the palletisation region 21, comprising an alarm 23 indication operational defects, and a printer 24. The palletisation installation will not be described, as this is of known type comprising a palletisation frame 25 and a transitional waiting platform for the palletised barrels 26, as shown in FIG. 2.

Before describing the apparatus and method of indentification in detail, a beer barrel and its identification supports will be examined.

Figure 6:
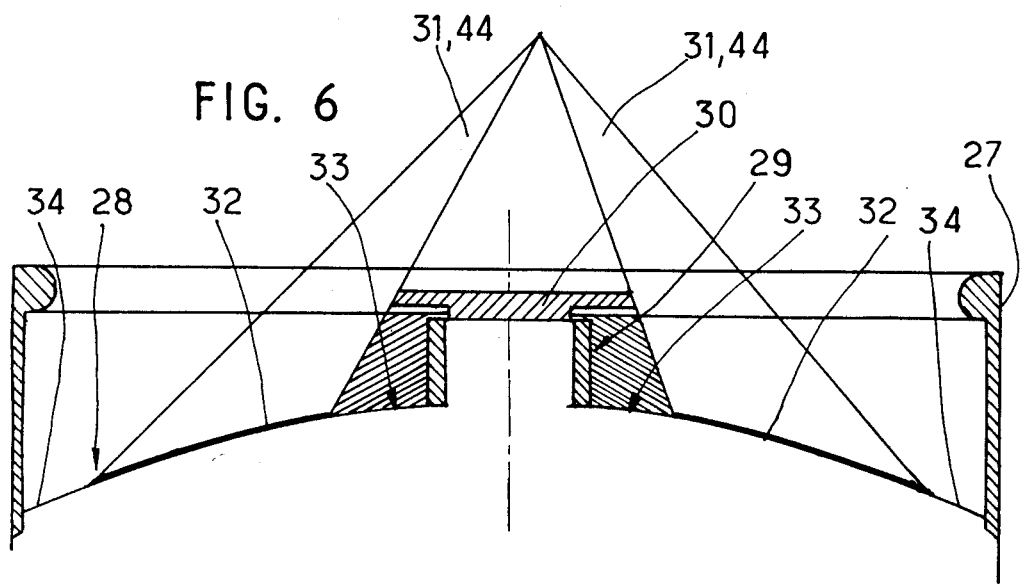
FIG. 6 is a vertical section through the top of a barrel, showing the cone of shadow and the cone of illumination corresponding to the scanning by the readers and the shadow of a bung and plunger head.

The barrels used are of present-day design and construction, of cylindrical shape with rolling hoops and upper and lower rims. Only the top half is shown in FIG. 6, which enables the arrangement requirements for the identification supports for optical scanning by the detectors to be better understood. The top part comprises the upper rim 27 surrounding the upper face 28 which comprises in its centre a bung hole 29 into which either a bung or the head of an incorporated plunger 30 is screwed.

Indentification is carried out by optical scanning in the form of two successive beams 31 emitted by two different detectors. These beams illuminate the upper face of the barrel and transmit images of the supports carrying the identification code to an analysis device.

These supports must be situated in a marking region 32 in the form of a ring bounded at its centre by a circular shadow region 33 projected by the head of the incorporated plunger, and at its edges by a peripheral ring 34 in order to provide reading accuracy and ease of labelling. The supports are in the form of rectangular self-adhesive labels 35, four in number, disposed on the upper face 28 of the barrel in the marking region 32.

Figure 7:
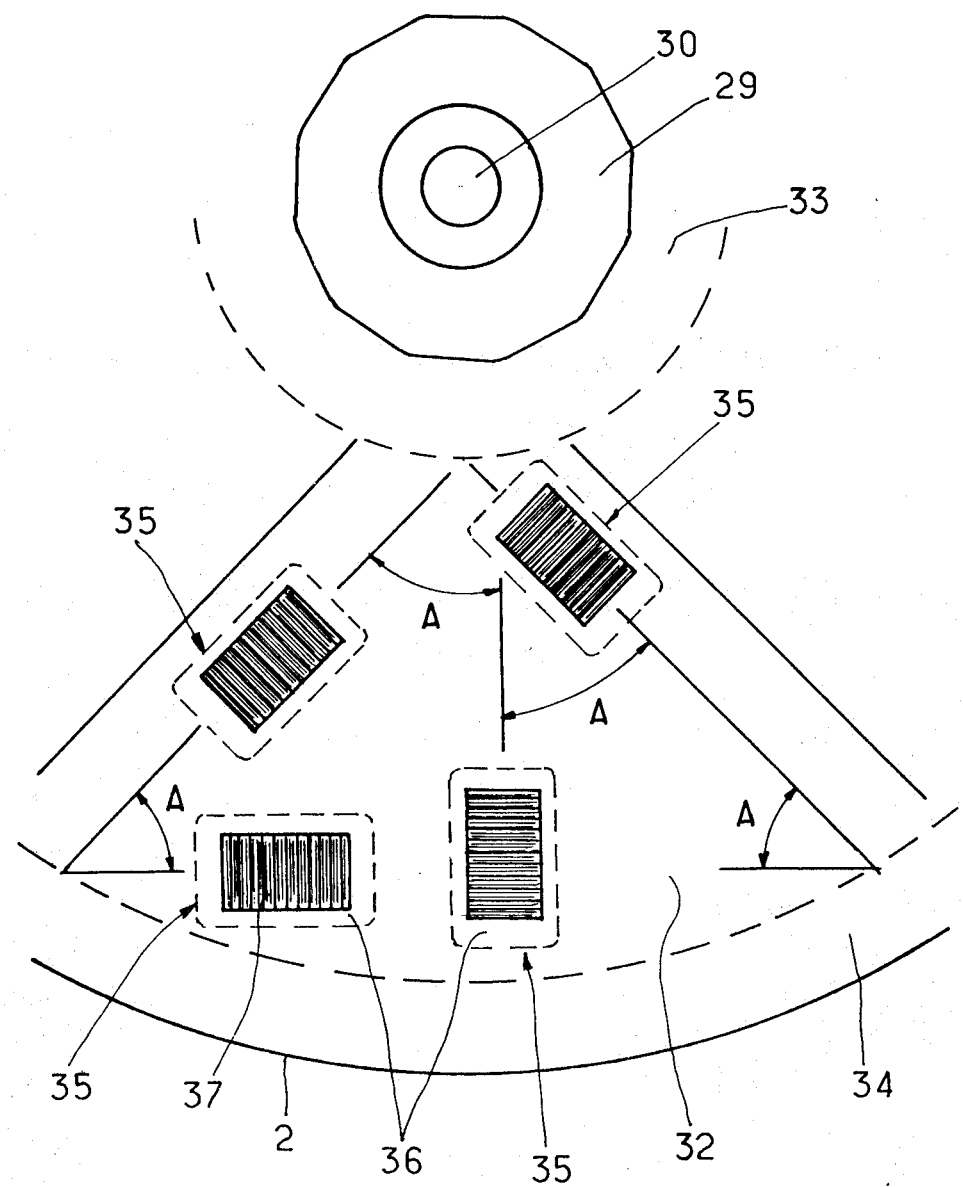
FIG. 7 is a plan view of the upper faces of the barrels which carry the identification labels in a grouped arrangement.

There are two possible arrangements, each with the characteristic of a common angular displacement A, preferably of 45°. A first arrangement consists of grouping them in the same region in the same half-circumference 33 (FIG. 7). Another arrangement which substantially limits certain optical faults of the detector and utilises only the effective field depth, consists of providing an arrangement on each side of a diameter as shown in FIG. 8. In this case, two opposite labels (practically diametrically opposite) have an angular displacement A equal or close to 45°.

Each label 35 is constituted by a self-adhesive polyester support 36, which is of special strength and carries on its exposed face, by printing or other means, an identification code 37, for example of the "two in five" bar type. This label must not only have high mechanical strength to resist shocks and constraints of any type, but must also have good resistance to chemical agents, environmental moisture and the steam sterilisation temperature of the barrel.

For this purpose, protection is provided by means of a self-adhesive rectangular coating 38 having a larger surface than the label so that it projects beyond the sides of the label, and is constituted of a transparent polyester known as MYLAR.

The installation continues in the form of an identification region comprising two detectors 39 and 40 associated with reliability cells 41 and 42 disposed along the conveying path of the barrels at the detector positions and fitted with reflectors 43 facing the cells on the opposite side. These latter ensure the reliability of the ascertaining of the information and the operation of the assembly from the start of the detection chain.

These detectors, preferably optical and operating on so-called coherent light, each form a beam 44, which scans and thus analyses the upper face of each barrel. The readers are either separate or joined at their top. They always form a contained acute angle B.

The drawing shows in broken lines another possible angle between the beams and two disconnected beams.

Tests have shown that the best detection takes place for an angle B equal or close to 45°, and preferably equal to the angle A between the labels.

The readers which analyse the upper face of the barrels are disposed above their conveying path as shown diagrammatically in FIG. 4, and spaced apart by a distance D greater than the diameter of a barrel.

The reading operation is carried out continuously as the barrels pass by under the readers, by very rapid optical scanning of the upper surface of the barrel, the barrels not possessing any predetermined orientation. The second reading completes or confirms the first reading, and is in fact utilised only if the first reader fails.

It is equally possible to have two disassociated readers, i.e. following each other in space.

These readers together with their operating circuits, constitute the detection chain. They are connected to interface circuits 45 each via a decoder 46 and 47. These interfaces are connected to the information processing unit 18 in order to interpret the data and register it on a support, for example a magnetic support 19.

The apparatus described above operates as follows.

The barrels reach the apparatus after all their filling and control operations, and are fed into the waiting region. The actual identification operation is then effected, this being of particular interest herein.

The barrels are conveyed by the conveyor 1, and arrive in front of the entry detector and pass through the entry door 9 into the identification region 10 where their passage through the converging fields of the two detectors enables them to be identified after decoding, and handled after processing in the information processor. Under normal operation, the entry door enables the barrels to be admitted into the identification region one after another.

In the exceptional case where reading is not effected, the barrels are conveyed to the diversion region by opening the barrier 6. In case of a fault, for example the blocking of the palletiser, there is an emergency stop control for stopping the assembly and closing the entry door.

The control signal is provided by a logic which takes account of the position of the barrels downstream of the identification region.

At least four non-deteriorating labels 35 having an identification code are glued onto the upper face of each beer barrel, the labels being grouped in the same half-surface and mutually displaced by a constant angle equal or close to 45°, taking care to avoid the prohibited regions, or being grouped according to the other arrangement indicated heretofore. The barrels are made to file upright, without previous orientation and by means of a conveyor, past an assembly of two optical detectors such that their upper faces are in the scanning field of the detectors, the two detectors being disposed one following the other and arranged such that they converge at an angle equal or close to 45°, the code then being analysed and handling automated by an information processing unit.

What we claim is:

1. Apparatus for automatically identifying barrels having machine readable codes on an end face thereof comprising a main conveyor for conveying the barrels therealong in a vertical orientation while exposing the code bearing end faces thereof, a secondary diversion conveyor extending from the main conveyor and separated therefrom by a barrier, a flow control assembly associated with the main conveyor comprising an entry door and a passage detector controlling movement of the barrels through the entry door, a barrel detection region downstream of the flow control assembly with two spaced detectors for scanning and reading the code on the upper faces of the barrels, which latter carry a plurality of identification labels bearing identical codes with at least two of said labels on each barrel oriented at an angle of about 45° relative to each other, the said detectors being disposed above the barrels in a position such that the scan of one detector is spaced from the scan of the other detector by a distance greater than the diameter of the barrel face and said spaced scans converge at an angle of about 45° to provide omnidirectional reading of said labels, said detectors being connected to an interface and an information processing unit for controlling operation of the entry door and the barrier.

2. Apparatus as claimed in claim 1, wherein the said detectors are optical detectors.

3. Apparatus as claimed in claim 1 or 2, wherein the identification labels are in the form of composite rectangular self-adhesive supports formed from a first self-adhesive support of non-deteriorating polyester resistant to chemical agents and high temperature carrying an identification code, and a protective part in the form of a covering of transparent polyester.

4. A method of identifying barrels, wherein at least four non-deteriorating identification labels carrying an identification code are attached to the upper surfaces of the barrels, the said labels being placed in particular in a detection region and mutually displaced by a constant angle of about 45°, comprising causing the barrels to file, in a vertical orientation, without previous rotational orientation and by means of a conveyor, past an assembly of two optical code reading detectors, the fields of which converge at a location remote from said conveyor at an angle of about 45° and are spaced along the conveyor by a distance greater than the dimension of said upper surfaces at the point of contact with said barrel surfaces, and analysing the code and processing the information in order to obtain completely automated handling of the barrels moving along the conveyor.

5. A method as claimed in claim 4, wherein the various labels are placed in an identification region bounded by a peripheral ring defined by the limit of the facility of the reader for optical detection and by a central ring formed by a conical shadow projected by the head of an incorporated plunger.

6. A method as claimed in claim 4, wherein the labels are disposed in a marking region either grouped together in the same half circumference and mutually displaced by a constant angle equal or close to 45°, or in pairs on opposite sides of a diameter, the homologues on opposite sides being displaced by an angle equal or close to 45°, and the homologues on the same side being in crossing disposition.

* * * * *